UNITED STATES PATENT OFFICE.

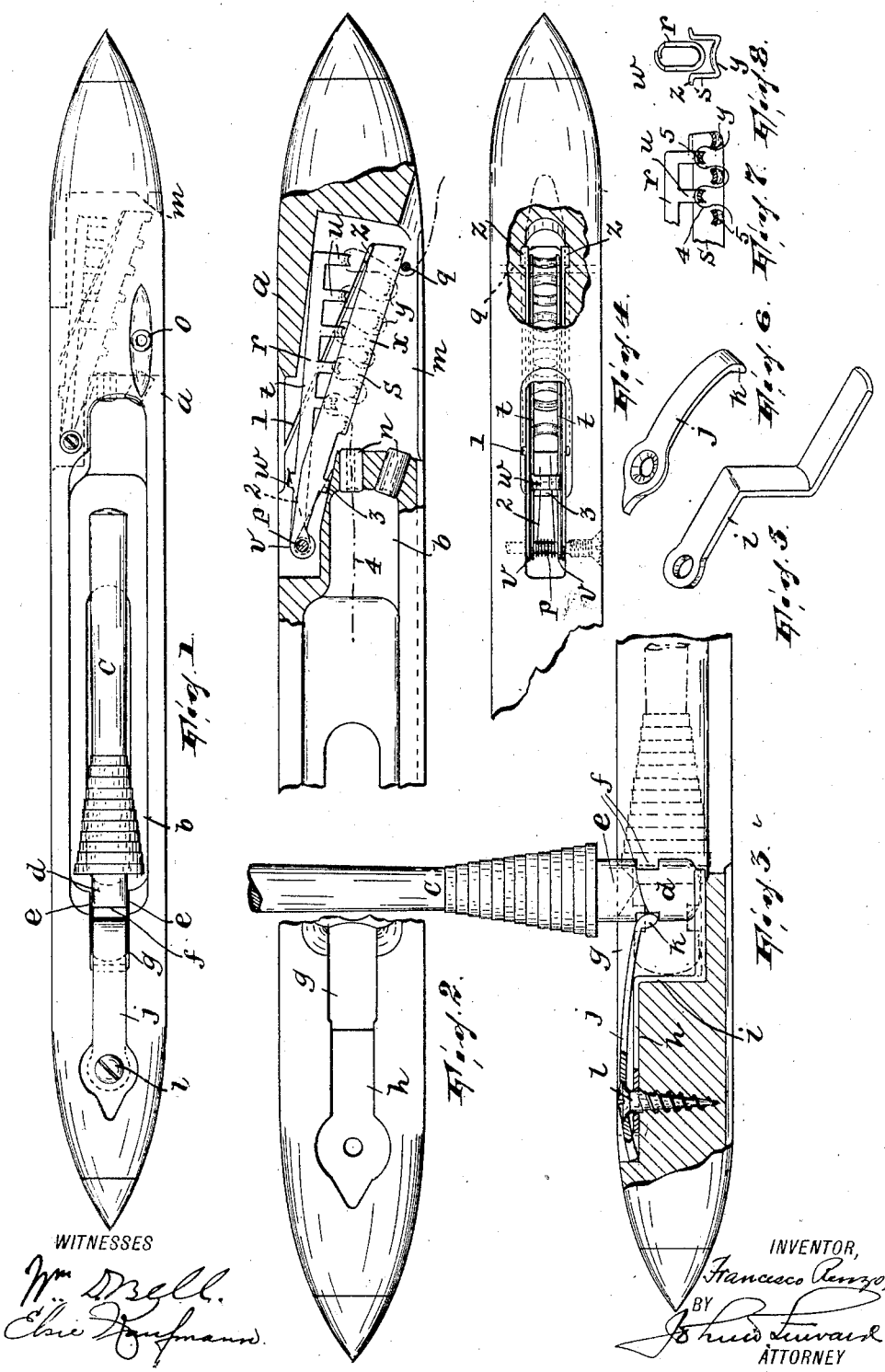

FRANCESCO RENZO, OF PATERSON, NEW JERSEY.

LOOM-SHUTTLE.

No. 919,637. Specification of Letters Patent. Patented April 27, 1909.

Application filed August 11, 1908. Serial No. 447,964.

*To all whom it may concern:*

Be it known that I, FRANCESCO RENZO, a citizen of the United States, residing in Paterson, Passaic county, New Jersey, have invented a certain new and useful Improvement in Loom-Shuttles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to shuttles for looms. One of the objects of the invention is so to construct a shuttle as to do away with the employment of the pivoted or other type of spindle or skewer commonly employed to support the quill, it being well known that shuttles have to be made with great care in order to arrange the mounting for the spindle in the shuttle in such manner as to prevent splitting of the shuttle in use and the working loose or the undue projecting of the pins or screws employed to secure the mounting in place.

Another object of the invention is to provide, in lieu of the usual wire thread tension device, a thread tension device of stamped metal, thereby cheapening the cost of manufacturing as well as making it possible to produce the friction and wear on the threads.

The invention will be found fully illustrated in the accompanying drawing, wherein, Figure 1 is a plan view of a shuttle constructed in accordance with my improvements; Fig. 2 is a plan view of the improved shuttle on a somewhat larger scale, certain parts being omitted and others shown in section; Fig. 3 is a longitudinal sectional view through the end of the shuttle in which the quill is secured, the quill being shown in its upright position, ready for removal from the shuttle; Fig. 4 is a side view of the other end-portion of the shuttle, a part of the shuttle body being broken away; Figs. 5 and 6 show details of the quill-holding means; and, Figs. 7 and 8 details of the tension device.

$a$, in the drawings, designates the shuttle body and $b$ the usual cavity for the quill $c$. Instead of the quill being formed with a bore, in accordance with the usual construction where it is mounted on a spindle in the shuttle, the quill in the present instance has its butt formed with an extension $d$ which is cylindrical when the quill is turned in the lathe but is later preferably cut flat on opposite sides, as at $e$. In the curved faces of the extension $d$ are formed notches $f$.

A cavity $g$ forming an extension of the quill cavity $b$ is provided, the same being adapted to receive the extension $d$ of the butt of the quill, the faces $e$ of said extension bearing against the sides of said cavity $g$ and thus holding the quill against rotation.

A countersink $h$ is formed in the top of the shuttle so as to communicate with the cavity $g$; this countersink receives one end of a plate $i$ which is then bent downwardly and then forwardly so as to follow the end and bottom walls, respectively, of cavity $g$ and which has its other end channeled (see Fig. 5). In the countersink $h$ is also arranged a curved plate spring $j$, the same having its convex side up, and an enlargement or lug $k$ on its inner end, said enlargement projecting downwardly into the cavity $g$. Plate spring $j$ and plate $i$ are secured in place by the screw $l$ which penetrates their outer ends and is driven into the shuttle, lateral play of the parts $i$ and $j$ being prevented by their somewhat snugly fitting the countersink $h$.

In placing the quill in the shuttle, its extension $d$ is introduced into the cavity $g$, the quill at that time standing upright; the quill being moved toward plate spring $j$ until its enlargement enters the adjoining notch $f$ in the quill, the quill is depressed, the operator taking care to keep the enlargement engaged in said recess $f$ until the quill is fully depressed. In this position, the outer end-portion of the plate $i$ being straight and longitudinal, as is also the corresponding portion of the surface of extension $d$, the spring $j$ not only prevents longitudinal movement of the quill in the shuttle but also prevents any vertical movement of the quill, either pivotal or otherwise.

The shuttle is provided, further, with the usual cavity $m$ for its tension device, and with the thread eyelets $n$ and $o$; the cavity $m$ is an opening penetrating the shuttle body from one side to the other and it is traversed by the pins $p$ and $q$. The tension device comprises two members $r$ and $s$, somewhat similar in form. The member $r$ is formed from a sheet metal blank comprising the parallel strips $t$ integrally connected by the arched loops $u$ and each having at one end an enlargement $v$ which serves as the bearing portion for the member, being penetrated by the pin $p$; adjoining the enlargement $v$, the strips have lugs $w$ which overlap each other and form a bridge. The member $s$ comprises the strips $x$ integrally connected by the loops $y$, arched reversely with reference to loops $u$ (see Fig. 8). The member $s$ has at one end the laterally extending lugs $z$; in assembling the parts of the tension device, the member $s$ is slid obliquely into the shuttle, its lugs $z$ following inclined grooves 1 in the sides of the cavity $m$, said grooves and the pin $p$, which penetrates the other end of the member $s$, acting to hold said member in place. The strips of member $s$ are wider apart than the strips of member $r$, so that the member $r$ may fall into a position where its strips $t$ stand side by side with the strips of member $s$; to permit this, the loops $u$ of member $r$ are so arranged as to alternate with the loops $y$ of member $s$, i. e., to stand opposite the spaces between loops $y$. The members are normally held, however, in the position shown in Fig. 2 by the spiral spring 2 which is coiled about the pin $p$ and has one end bearing against the bridge $w$ of member $r$ and its other end bearing against a similar bridge 3 of member $s$. The thread 4 extends from the quill through one of the eyelets $n$ and then alternately around the respective loops of members $s$ and $r$, finally passing around the pin $q$. To reduce the wear on the threads, each loop $u$ and $y$ is cross sectionally curved, as at 5 in Fig. 7.

Having thus fully described my invention, what I claim as new and desire to secure by Letters Patent is:

1. In a shuttle, a thread tension device comprising two elongated members, each member comprising parallel side strips and loops connecting and integral with said side strips, the loops in one of said members alternating with those in the other, and one of said members having pivotal movement relatively to the other, substantially as described.

2. In a shuttle, a thread tension device comprising two elongated members, each member comprising parallel side strips and loops connecting and integral with said side strips, the loops in one of said members alternating with those in the other, and one of said members having pivotal movement relatively to the other, and the loops of one of said members being arched and projecting toward the other member, substantially as described.

3. In a shuttle, a thread tension device, comprising two elongated members of stiff sheet material, each member comprising parallel side strips and integral spaced arched thread-engaging loops connecting said strips, and one of said members having pivotal movement relatively to the other, substantially as described.

4. The combination of the shuttle body, a pivot arranged therein, two elongated members of stiff sheet material, each member comprising parallel side strips and integral spaced arched thread-engaging loops connecting said strips, one of said members being normally fixed in the shuttle and the other being fulcrumed on said pivot, and a spring normally holding said members apart, substantially as described.

In testimony, that I claim the foregoing, I have hereunto set my hand this 4th day of August, 1908.

FRANCESCO RENZO.

Witnesses:
JOHN W. STEWARD,
WM. D. BELL.